US011433787B2

(12) United States Patent
Olfers et al.

(10) Patent No.: US 11,433,787 B2
(45) Date of Patent: Sep. 6, 2022

(54) CHILD SEAT TRANSPORTING SYSTEM AND SAFETY PART SUITABLE FOR A CHILD SEAT TRANSPORTING SYSTEM

(71) Applicant: Dorel Juvenile Group, Inc., Foxboro, MA (US)

(72) Inventors: Dennis Olfers, AV Leende (NL); Robért Sjang Josine Van Dijk, Eindhoven (NL); Sanders Gerardus Toonders, Valkenswaard (NL)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/922,302

(22) Filed: Jul. 7, 2020

(65) Prior Publication Data

US 2021/0009011 A1    Jan. 14, 2021

(30) Foreign Application Priority Data

Jul. 10, 2019    (NL) ..................................... 2023469

(51) Int. Cl.
*B60N 2/28* (2006.01)
*B62B 7/14* (2006.01)

(52) U.S. Cl.
CPC ......... *B60N 2/2821* (2013.01); *B60N 2/2845* (2013.01); *B62B 7/145* (2013.01)

(58) Field of Classification Search
CPC ............................ B60N 2/2821; B60N 2/2845
USPC ..................................................... 297/256.16
See application file for complete search history.

(56) References Cited

U.S. PATENT DOCUMENTS

| 3,596,986 A | 8/1971 | Ragsdale |
| 5,806,924 A | 9/1998 | Gonas |
| 5,893,606 A * | 4/1999 | Chiang ................ B60N 2/2848 297/118 |
| 6,017,088 A * | 1/2000 | Stephens ................ A47D 13/02 297/256.16 X |
| 6,199,949 B1 | 3/2001 | Dasilva |
| 6,375,260 B1 | 4/2002 | Hiramatsu |

(Continued)

FOREIGN PATENT DOCUMENTS

DE    102004049919 A1    4/2006
EP        1175858 A2    1/2002

(Continued)

OTHER PUBLICATIONS

Netherlands Search Report for Netherlands App. No. NL2023469 dated Mar. 3, 2020, 7 pages.

(Continued)

*Primary Examiner* — Rodney B White
(74) *Attorney, Agent, or Firm* — Barnes & Thornburg LLP

(57) ABSTRACT

A child seat transporting system comprising a base being detachably connectable to a vehicle seat, a safety part being detachably connectable to the base and a child seat being detachably connectable to the safety part. The child seat comprises at least one child seat handle to carry the child seat when disconnected from the safety part. The safety part, when disconnected from the base, is detachably connectable to a frame of a stroller, whereby when the safety part with the child seat connected thereto is connected to the frame of the stroller, the child seat is detachable from the safety part.

19 Claims, 23 Drawing Sheets

(56) References Cited

U.S. PATENT DOCUMENTS

| | | | |
|---|---|---|---|
| 6,386,632 B1 | 5/2002 | Goor | |
| 6,517,153 B1* | 2/2003 | Brewer | A47C 7/66 |
| | | | 297/184.1 |
| 6,715,828 B1 | 4/2004 | Cheng | |
| 6,910,696 B2* | 6/2005 | Bargery | B60N 2/2845 |
| | | | 280/30 |
| 6,913,313 B2 | 7/2005 | Sedlack | |
| 7,488,034 B2 | 2/2009 | Ohren | |
| 7,597,396 B2 | 10/2009 | Longenecker | |
| 8,070,228 B2 | 12/2011 | Karremans | |
| 8,186,757 B2 | 5/2012 | Duncan | |
| 8,702,169 B2 | 4/2014 | Abadilla | |
| 8,714,639 B2 | 5/2014 | Heisey | |
| 8,911,015 B2* | 12/2014 | Cohen | B60N 2/2812 |
| | | | 297/256.16 |
| 8,998,312 B2 | 4/2015 | Sellers | |
| 9,056,567 B2 | 6/2015 | Wuerstl | |
| 9,066,610 B2 | 6/2015 | Duan | |
| 9,119,483 B1* | 9/2015 | Heisey | B62B 7/142 |
| 9,597,986 B2 | 3/2017 | Hou | |
| 9,771,006 B2 | 9/2017 | Forbes | |
| 9,771,007 B2 | 9/2017 | Shellenberger | |
| 10,028,592 B1 | 7/2018 | Ruiz | |
| 10,220,734 B2* | 3/2019 | Cohen | B60N 2/2812 |
| 10,363,842 B2 | 7/2019 | Anderson | |
| 11,034,266 B2* | 6/2021 | Heisey | A47D 13/025 |
| 11,134,793 B2* | 10/2021 | Smith | B60N 2/2812 |
| 2010/0225150 A1 | 9/2010 | Duncan | |
| 2010/0230933 A1* | 9/2010 | Dean | B62B 7/142 |
| | | | 280/647 |
| 2010/0231019 A1* | 9/2010 | Berkey | A47D 1/0081 |
| | | | 297/256.1 |
| 2014/0292049 A1 | 10/2014 | St Pierre | |
| 2015/0266399 A1* | 9/2015 | Lake | B60N 2/2821 |
| | | | 297/256.12 |
| 2016/0031343 A1 | 2/2016 | Juchniewicz | |
| 2017/0065098 A1 | 3/2017 | Taylor | |
| 2018/0186254 A1* | 7/2018 | Chen | B60N 2/2875 |
| 2018/0334059 A1* | 11/2018 | Churilla | B62B 9/203 |
| 2020/0260884 A1* | 8/2020 | Smith | B62B 9/24 |
| 2020/0269733 A1* | 8/2020 | Heisey | B60N 2/2863 |
| 2020/0307423 A1 | 10/2020 | Abro | |
| 2021/0023969 A1* | 1/2021 | Coakley | B60N 2/2872 |

FOREIGN PATENT DOCUMENTS

| | | |
|---|---|---|
| EP | 1259396 A1 | 11/2002 |
| EP | 1591306 A2 | 11/2005 |
| EP | 1591307 A2 | 11/2005 |
| EP | 1837230 B1 | 9/2007 |
| EP | 1969974 B1 | 9/2008 |
| EP | 1974988 B1 | 10/2008 |
| EP | 2108566 B1 | 10/2009 |
| EP | 2210768 B1 | 7/2010 |
| GB | 2429401 A | 2/2007 |
| WO | 199707716 A1 | 3/1997 |
| WO | 200164471 A1 | 9/2001 |
| WO | 2006094341 A1 | 9/2006 |
| WO | 2017029273 A1 | 2/2017 |

OTHER PUBLICATIONS

Netherlands Search Report for Netherlands App. No. NL2023470 dated Mar. 4, 2020, 7 pages.

Office Action dated Jun. 9, 2021 for U.S. Appl. No. 16/938,196 (pp. 1-11).

Office Action dated Sep. 15, 2021 for U.S. Appl. No. 16/922,407 (pp. 1-9).

Office Action dated Sep. 15, 2021 for U.S. Appl. No. 16/938,196 (pp. 1-14).

Office Action (Non-Final Rejection) dated Jun. 7, 2022 for U.S. Appl. No. 16/937,885, (pp. 1-13).

* cited by examiner

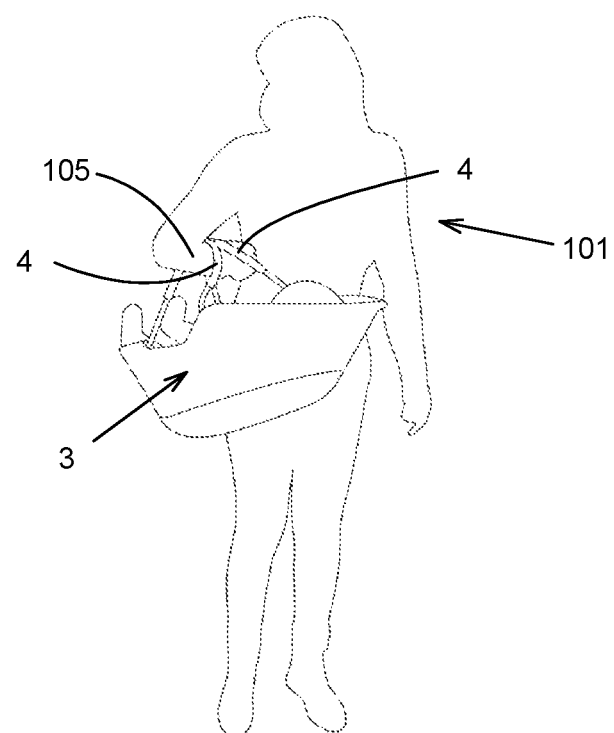
Fig. 15
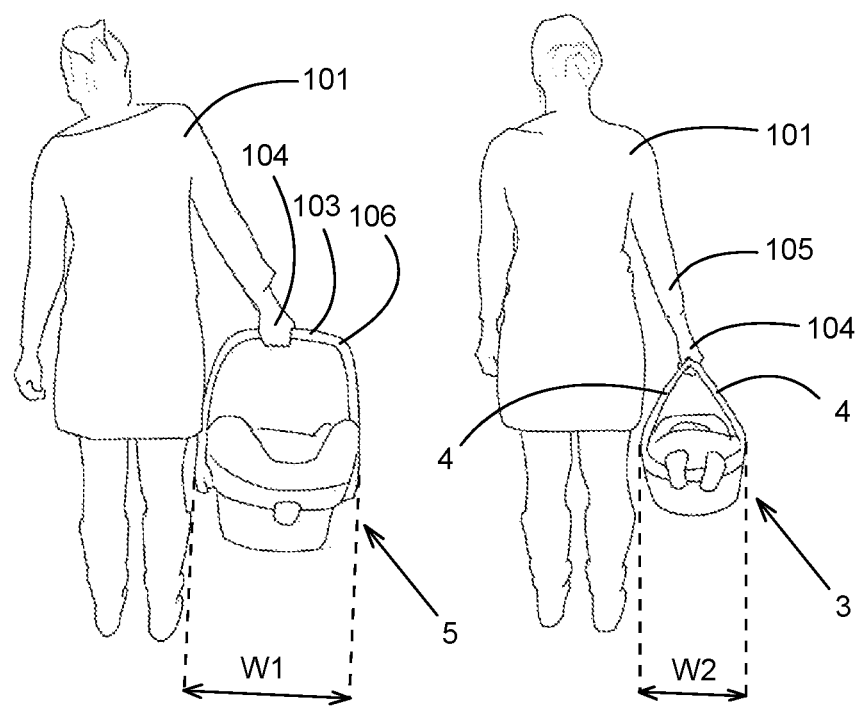
Fig. 16A
Fig. 16B

CHILD SEAT TRANSPORTING SYSTEM AND SAFETY PART SUITABLE FOR A CHILD SEAT TRANSPORTING SYSTEM

PRIORITY CLAIM

This application claims priority to Dutch Patent Application No. 2023469, filed Jul. 10, 2019, which is expressly incorporated by reference herein.

BACKGROUND

The present disclosure relates to a child seat transporting system comprising at least a safety part being detachably connectable to a vehicle seat and a child seat being detachably connectable to the safety part, which child seat comprises at least one child seat handle to carry the child seat when disconnected from the safety part. More particularly, the present disclosure further relates to a safety part suitable for a child seat transporting system.

SUMMARY

According to the present disclosure, a child seat transporting system whereby the child seat can easily be carries around whilst still being suitable to be used in a vehicle and on a frame of a stroller is provided.

In illustrative embodiments, the child seat transporting system according to the present disclosure in that the safety part, when disconnected from the vehicle seat, is detachably connectable to a frame of a stroller, whereby when the safety part with the child seat connected thereto is connected to the frame of the stroller, the child seat is detachable from the safety part.

In illustrative embodiments, because the width of the safety part will be so large that its longitudinal sides can be connected to supporting elements on the sides of the frame of the stroller, the width of the child seat connected to safety part can and will be smaller than a comparative inner seat.

In illustrative embodiments, the child seat transporting system according to the present disclosure the safety part is used as intermediate part between the child seat and the vehicle seat, as well as intermediate part between the child seat and the frame of the stroller.

In illustrative embodiments, when transporting the child seat outside the vehicle and outside the stroller, the child seat can be carried alone or connected to the safety part. If carried alone, the child seat is relative light, compact and can easily be carried around, wherein the child can still maintain the same position in the child seat and does not need to be woken up. If a more sturdy construction around the child seat is desired, the child seat connected to the safety part can carried around. The child seat only needs to provide a comfortable seating part for a child, whilst safety provisions required by regulations for use of the child seat in a vehicle or in a stroller will be provided by the safety part. Another advantage of having a safety part and a child seat is that extra functionalities can be put into the safety part, like active cooling or electronic communication, that might be heavy and bulky.

In illustrative embodiments, it is possible to connect the safety part directly to the vehicle seat, wherein the child seat is connected to the safety part. It is also possible to connect the safety part via a base to the vehicle seat.

In illustrative embodiments, the use of the safety part provides the child seat transporting system with a number of different possibilities to transport the child seat depending on the wishes of a user like the adult of the child.

In illustrative embodiments, the child seat transporting system according to the present disclosure is characterized in that the safety part comprises at an inner side thereof at least one first connector to detachably connect the child seat to the safety part, and at an outer side thereof at least one second connectors at a first and a second longitudinal side of the safety part to detachably connect the safety part to the frame of the stroller.

In illustrative embodiments, by having different connectors each with its own function and purpose, each connector can be configured for said function and purpose.

In illustrative embodiments, the child seat transporting system according to the present disclosure is characterized in that the safety part comprises third connectors to detachably connect the safety part to the vehicle seat by means of vehicle seat belts. This has the advantage that the safety part can be connected directly to the vehicle seat.

In illustrative embodiments, the child seat transporting system according to the present disclosure is characterized in that the child seat transporting system comprises a base being detachably connectable to the vehicle seat, wherein the safety part is detachably connectable to the base.

In illustrative embodiments, using a base to connect the safety part to the vehicle seat has the advantage that the base can be configured at one side for the connection with the vehicle seat and at another side for the connection with the safety part.

In illustrative embodiments, such a base can be installed in one vehicle, for example the vehicle from which the safety seat must frequently be removed, whilst the safety part is directly connected to the vehicle seat of another vehicle which vehicle is incidentally used.

In illustrative embodiments, such a base also has the advantage that the safety part can easily remain in the vehicle, whilst the child seat can easily be taken out of the safety part.

In illustrative embodiments, the child seat transporting system according to the present disclosure is characterized in that the safety part comprises at least one fourth connector to detachably connect the safety part to the to the base. Such fourth connector can be configured for its function and purpose.

In illustrative embodiments, the child seat transporting system according to the present disclosure is characterized in that the safety part comprises a safety part handle to carry at least the safety part together with the child seat connected thereto, when the safety part is disconnected from the vehicle seat and the frame of the stroller.

In illustrative embodiments, such safety part handle makes it easier to carry around the safety part together with the child seat connected thereto, when disconnected from the vehicle seat, the base connected to the vehicle set and the frame of the stroller.

In illustrative embodiments, the child seat transporting system according to the present disclosure is characterized in that the safety part handle is connected to the first and second longitudinal side of the safety part, whilst the at least one child seat handle extends substantially parallel to longitudinal sides of the child seat, wherein the longitudinal side of the safety part and the longitudinal sides of the child seat extend parallel to each other when the child seat is connected to the safety part.

In illustrative embodiments, the safety part handle extends perpendicular to the longitudinal side of the safety part and over the child seat when the child seat is connected to the safety part. The one child seat handle extends substantially parallel to longitudinal sides of the child seat. The user can carry the safety part with the child seat connected thereto with the safety part handle or the child seat handle. In this way a user can decide which orientation of the handle he/she prefers.

In illustrative embodiments, the child seat transporting system according to the present disclosure is characterized in that the safety part handle has a rigid U-shaped form.

In illustrative embodiments, such a rigid U-shaped form being also pivotable with respect to the safety part, forms a sturdy handle.

In illustrative embodiments, the child seat transporting system according to the present disclosure is characterized in that the at least one child seat handle is retractable under spring force.

In illustrative embodiments, by having a retractable child seat handle, the handle will be moved out of the way when not being used so it will not hinder the child.

In illustrative embodiments, the child seat transporting system according to the present disclosure is characterized in that the child seat comprises two child seat handles, one near each of the two longitudinal sides of the child seat.

In illustrative embodiments, by having two handles a more stable position of the child seat is obtain when it is carried around.

In illustrative embodiments, the child seat transporting system according to the present disclosure is characterized in that the child seat comprises a harness system to hold a child in the child seat.

In illustrative embodiments, such harness system blocks the child to leave the child seat and restrains the child during a crash of the vehicle.

In illustrative embodiments, the present disclosure also relates to a safety part suitable for such a child seat transporting system which safety part is in use detachably connectable to at least a vehicle seat and a frame of a stroller, wherein in use a child seat is detachably connectable to the safety part.

In illustrative embodiments, the safety part provides the child seat transporting system with a number of different possibilities to transport the child seat depending on the wishes of a user.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
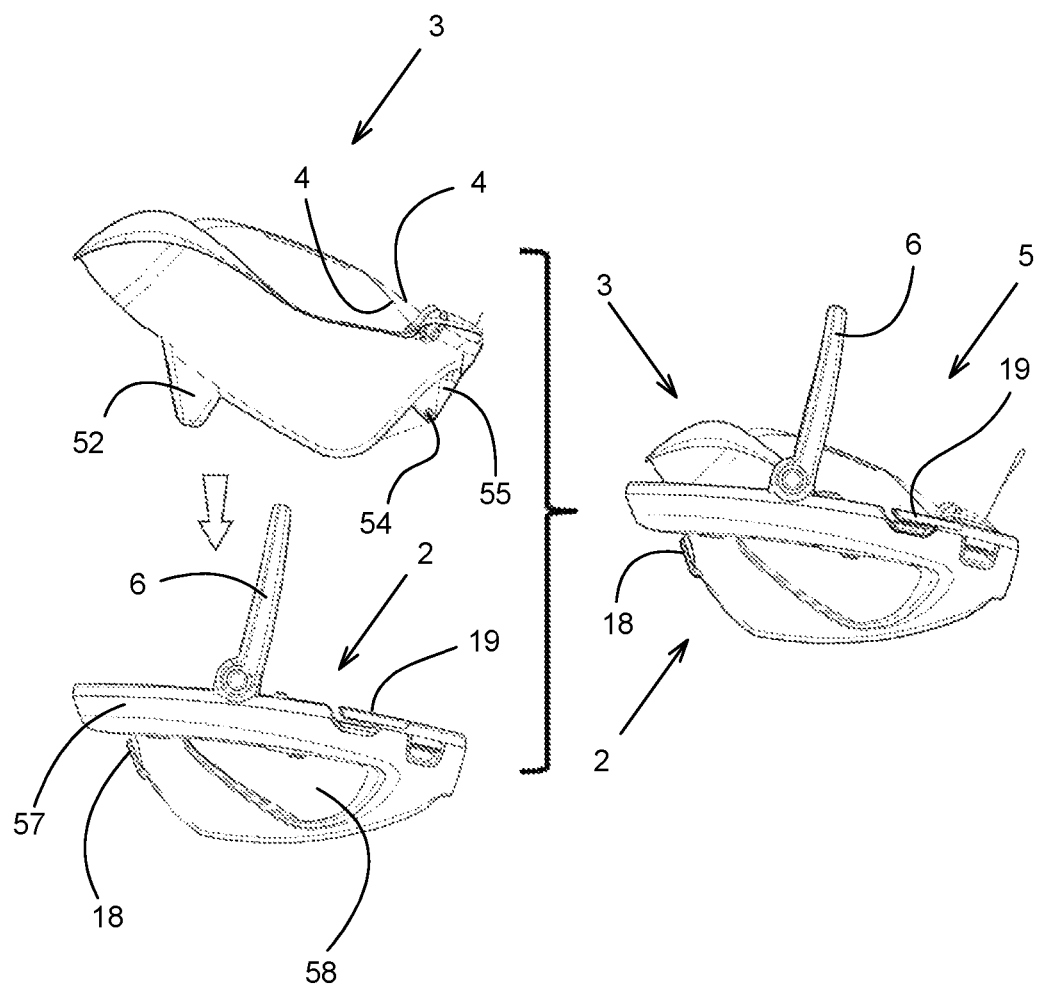
FIG. 1 is a side view showing a safety part and a child seat according the a first embodiment of the child seat transporting system according to the present disclosure in a disconnected and connected position.
Figure 4A:
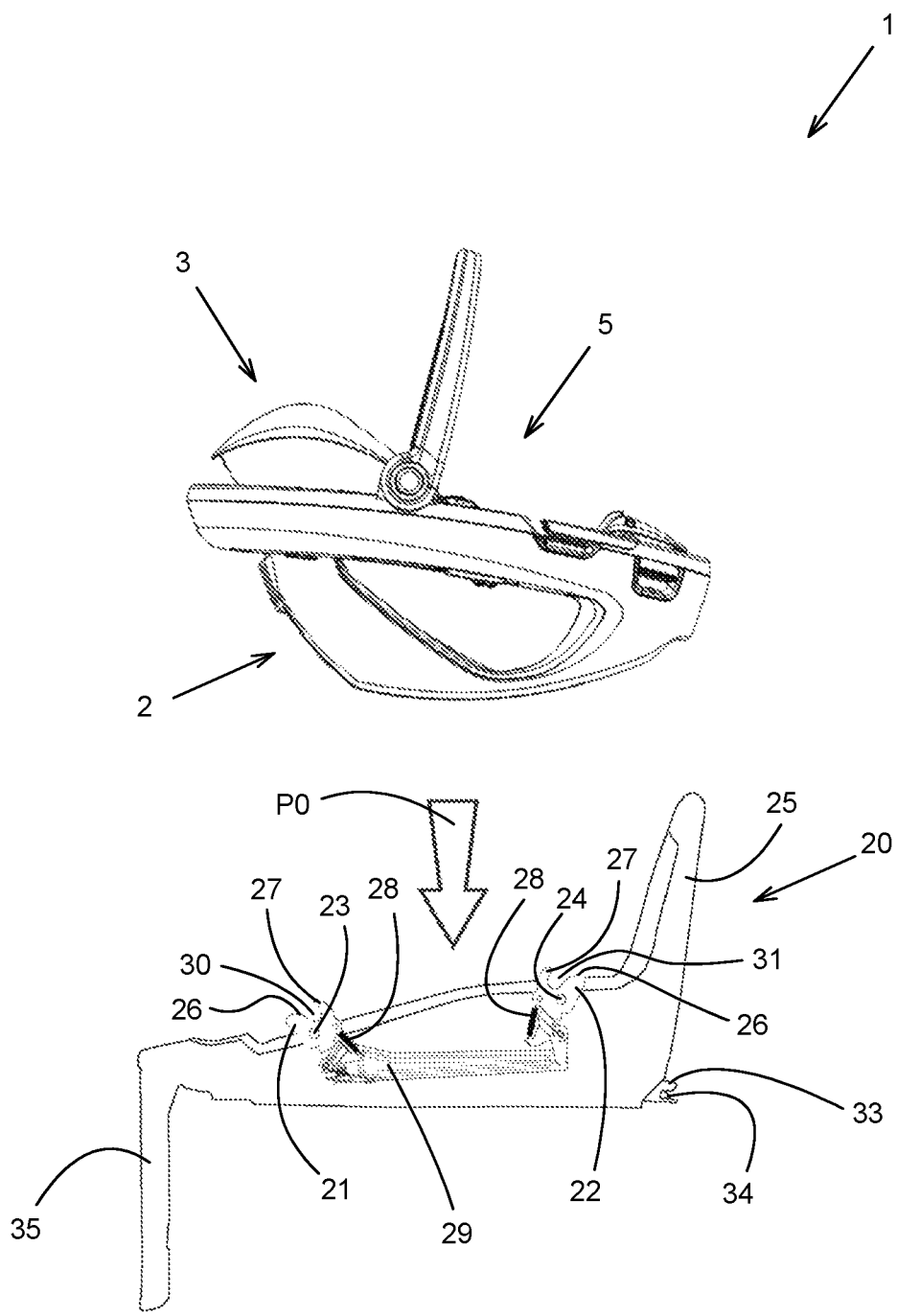
Figure 4B:
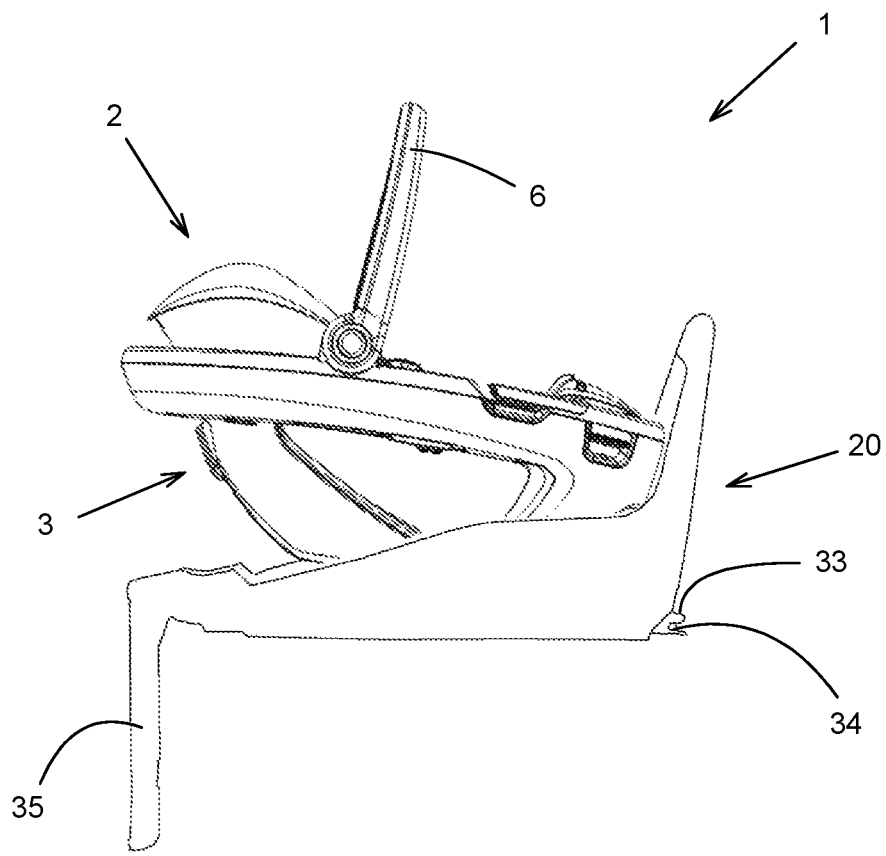
Figure 4C:
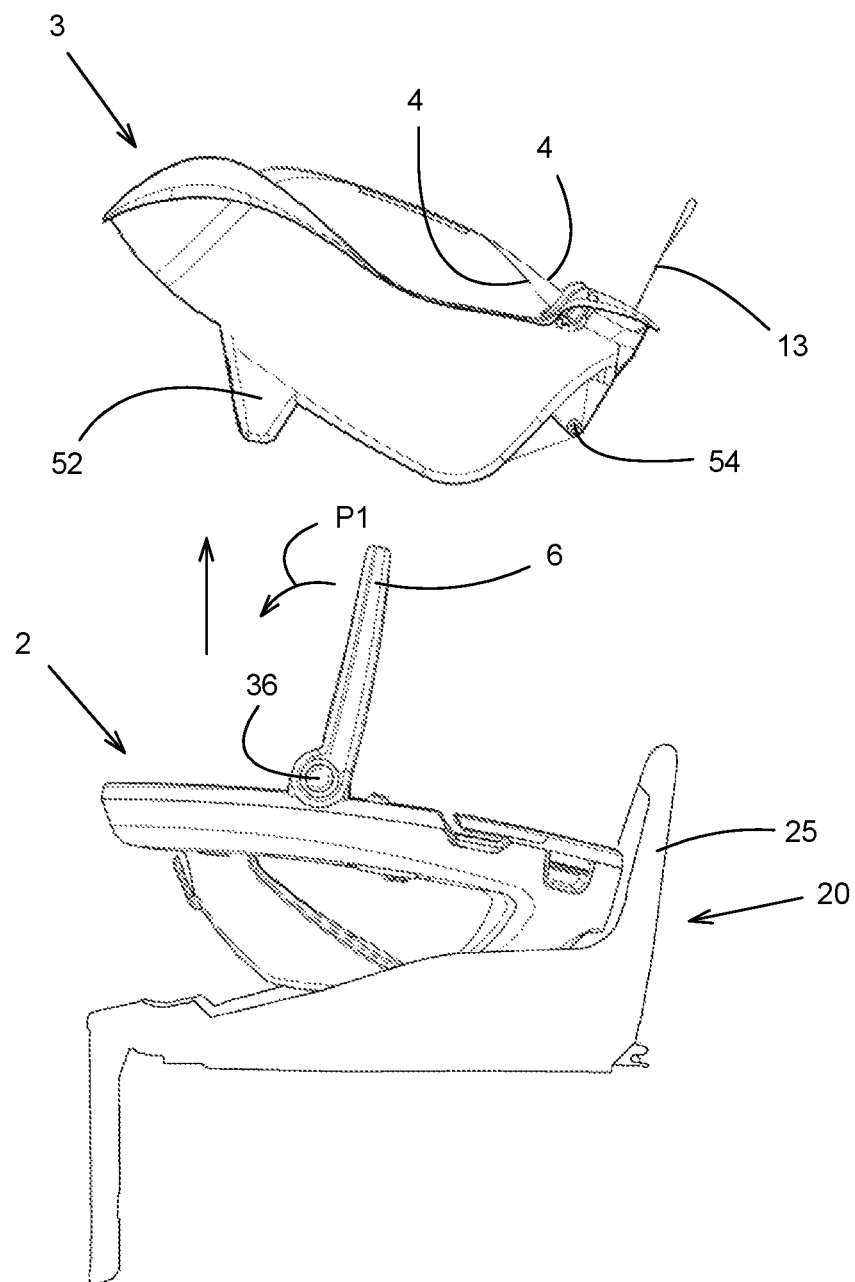
Figure 6A:
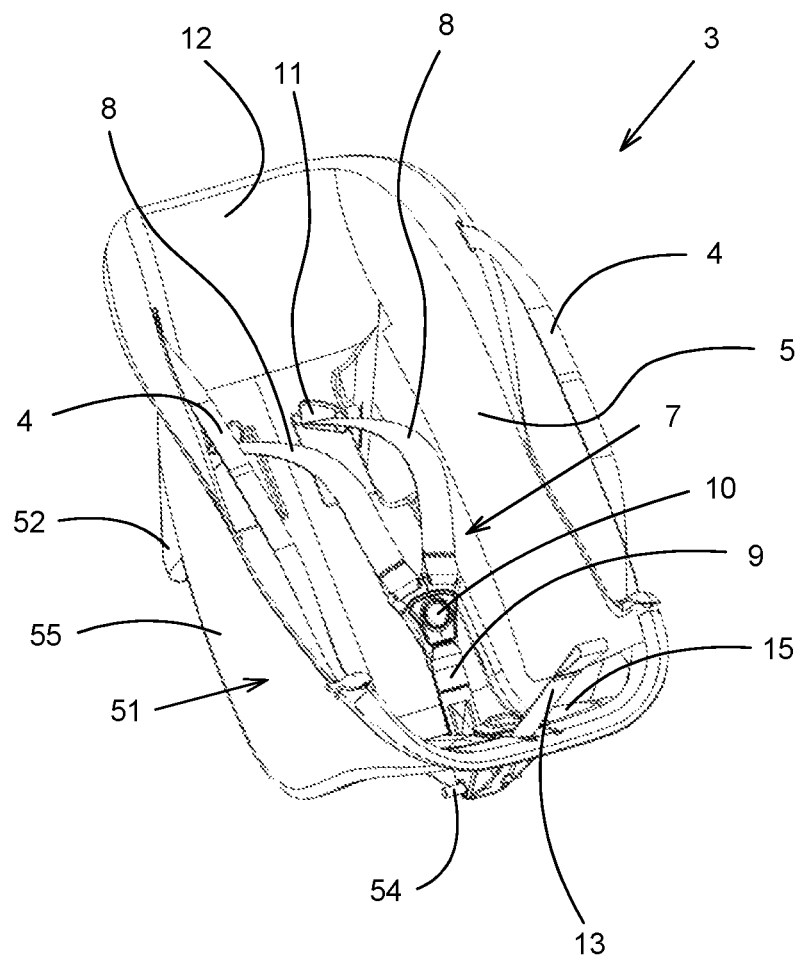
Figure 6B:
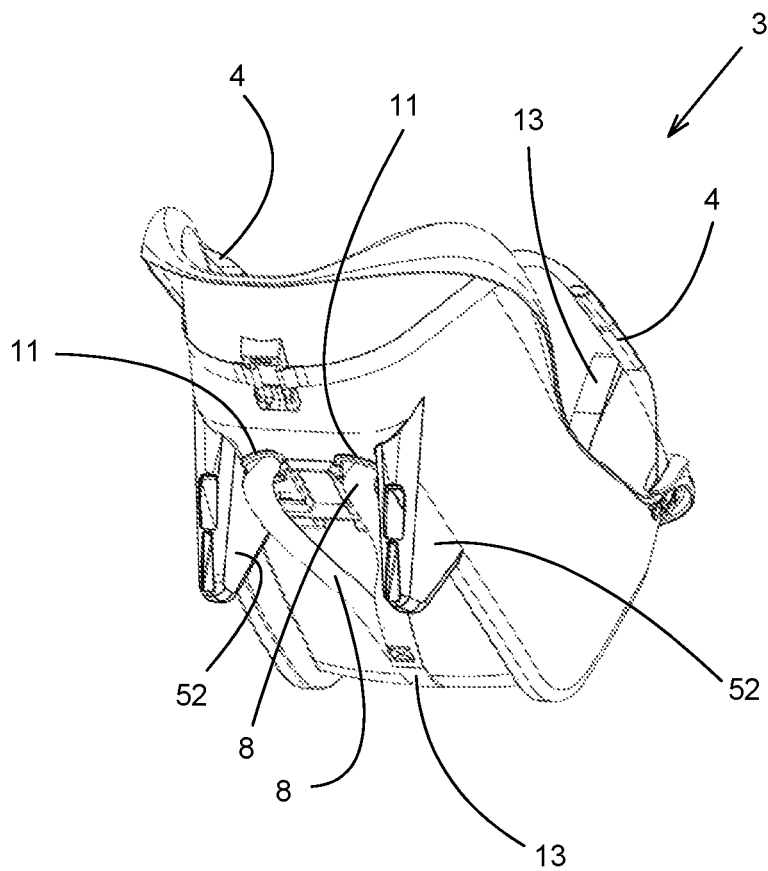
Figure 6C:
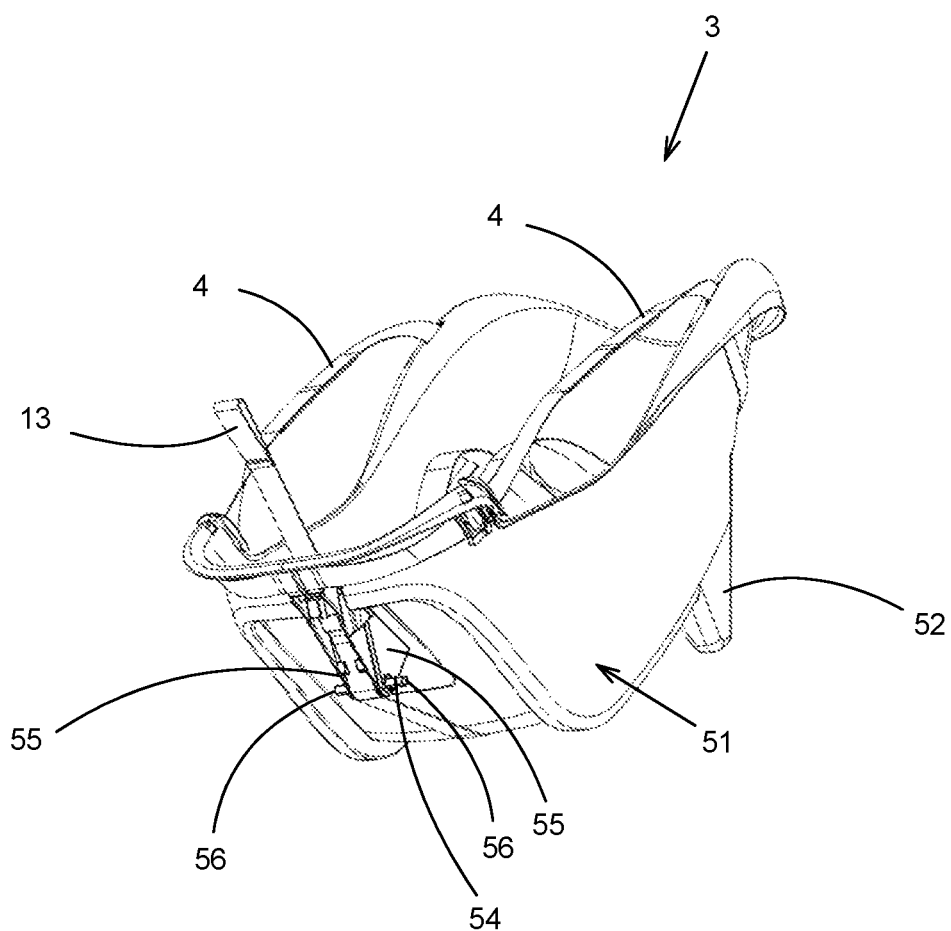
Figure 7A:
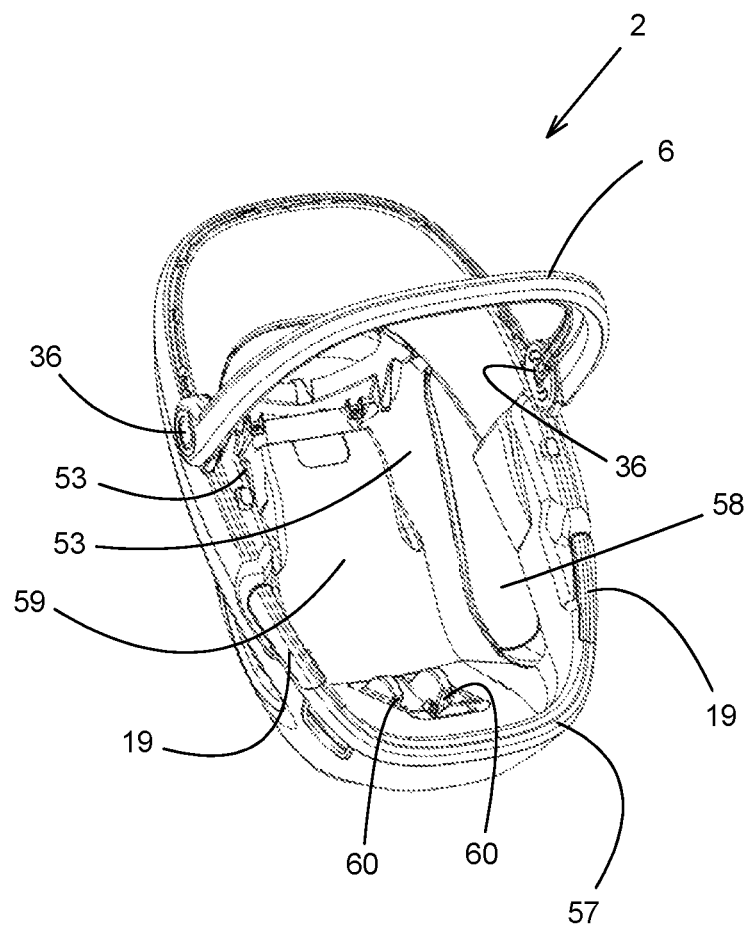
Figure 7B:
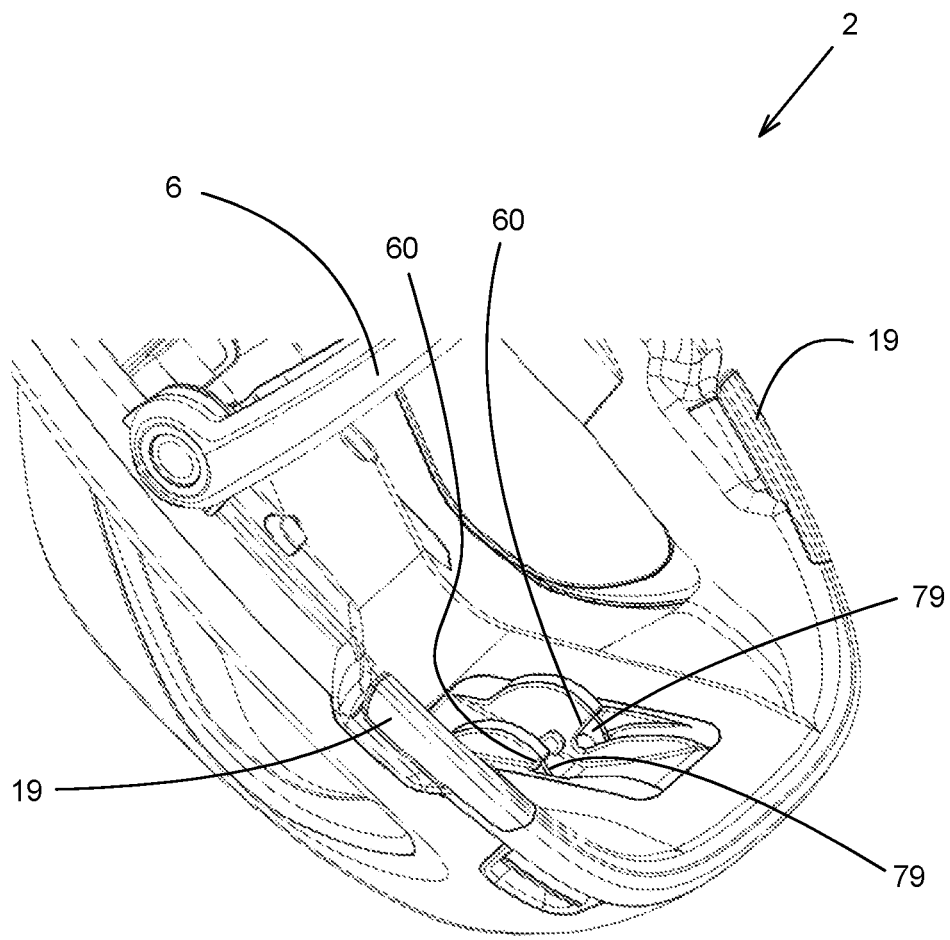
Figure 8:
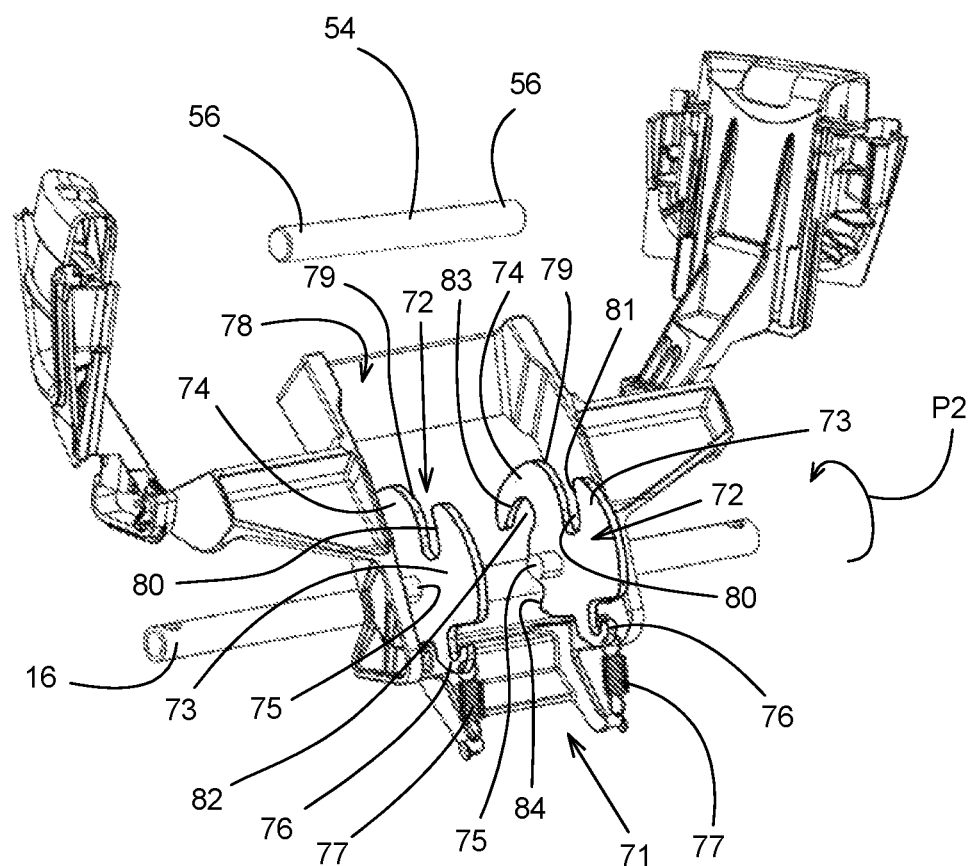
Figure 9A:
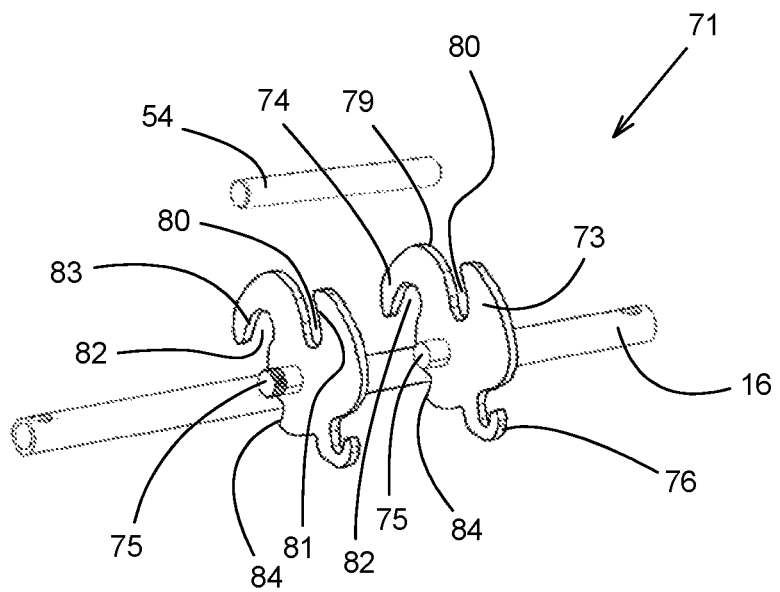
Figure 9B:
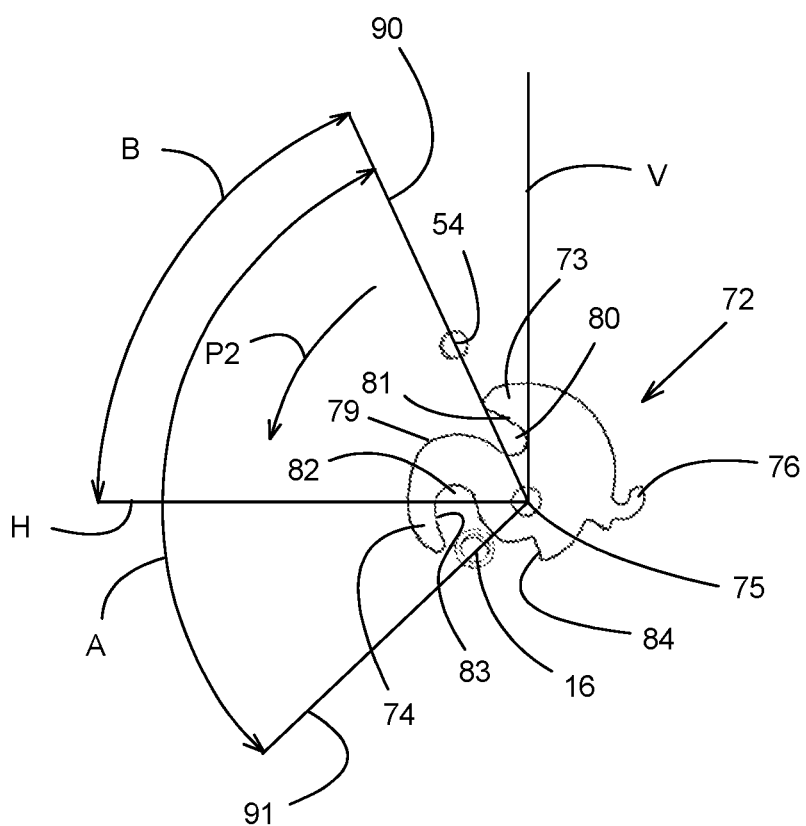
Figure 10A:
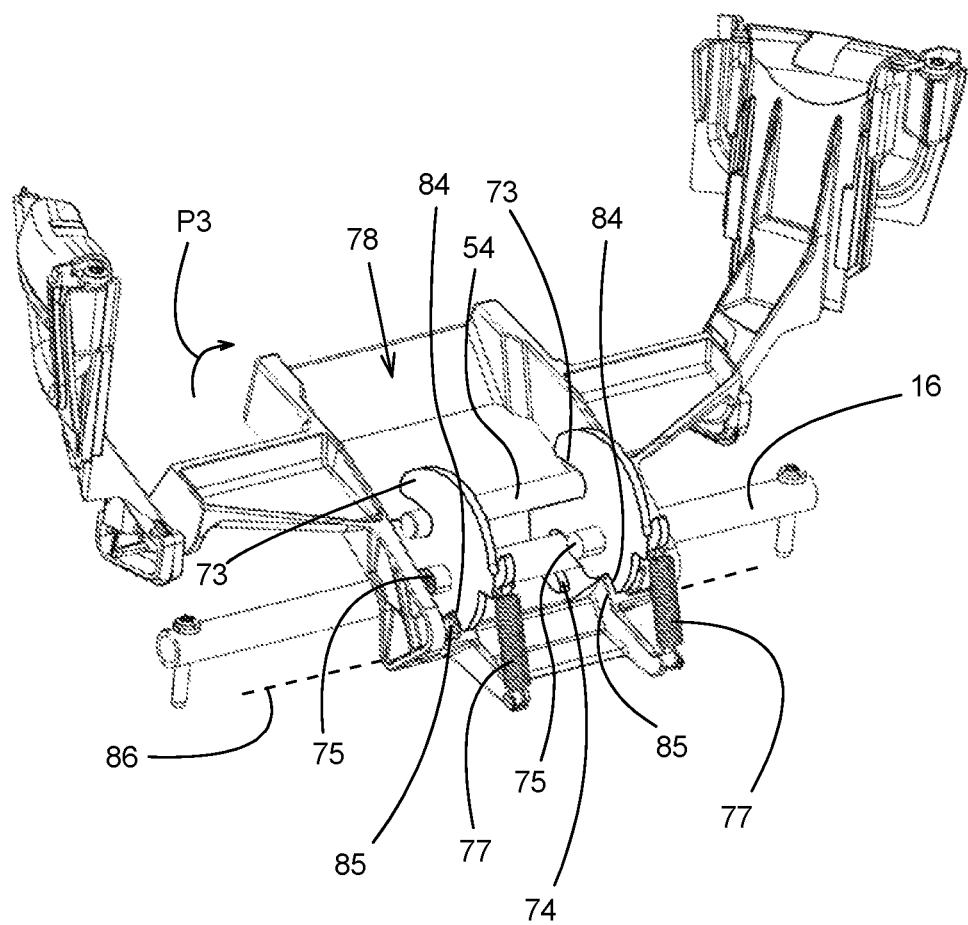
Figure 10B:
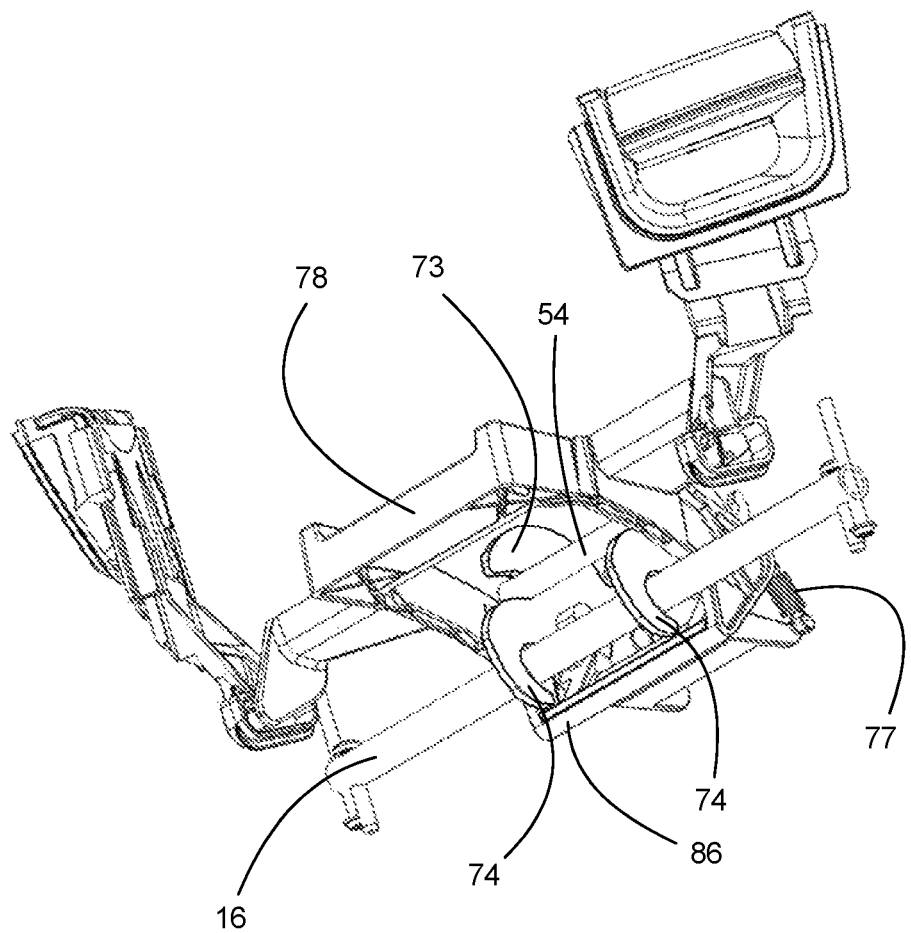
Figure 11A:
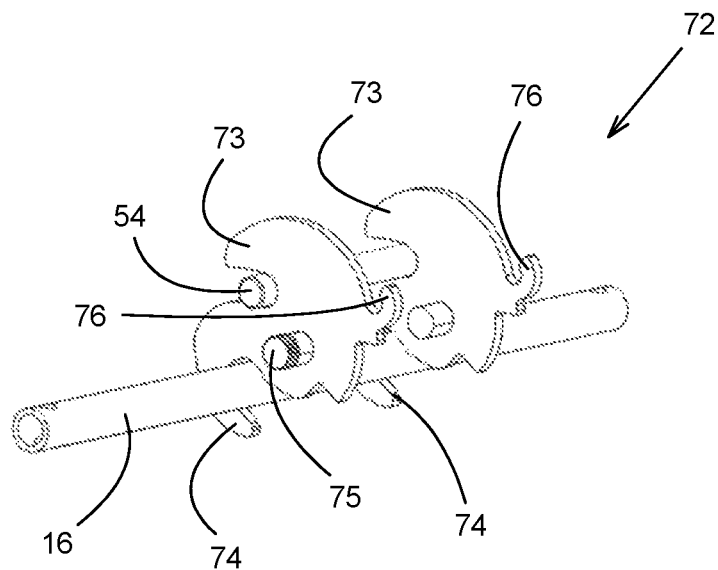
Figure 11B:
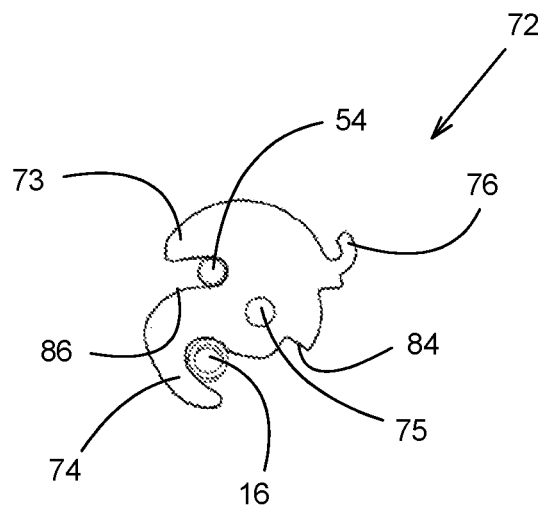
Figure 12A:
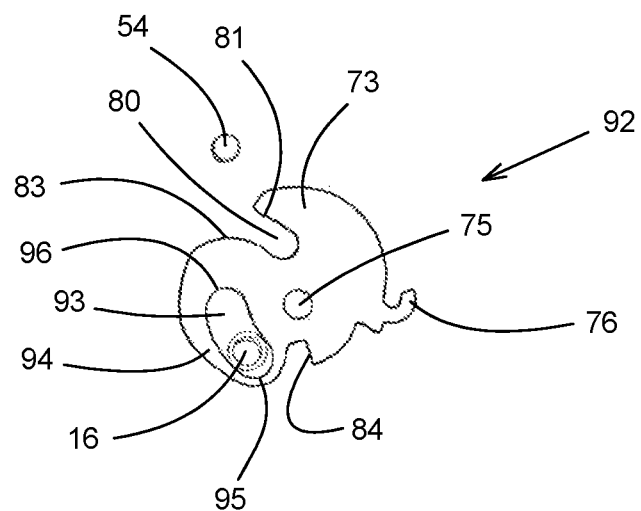
Figure 12B:
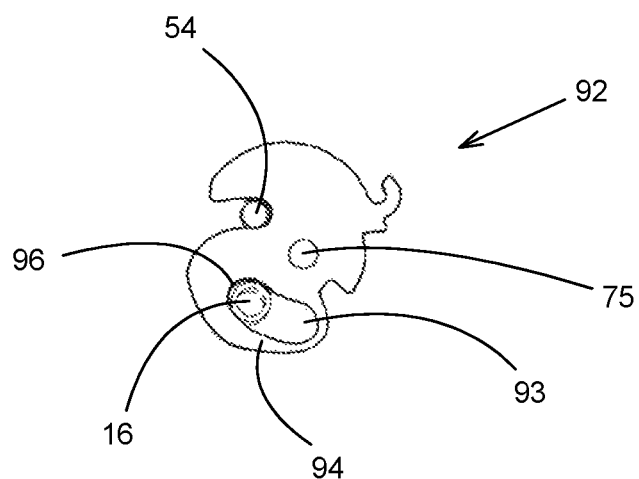
Figure 13:
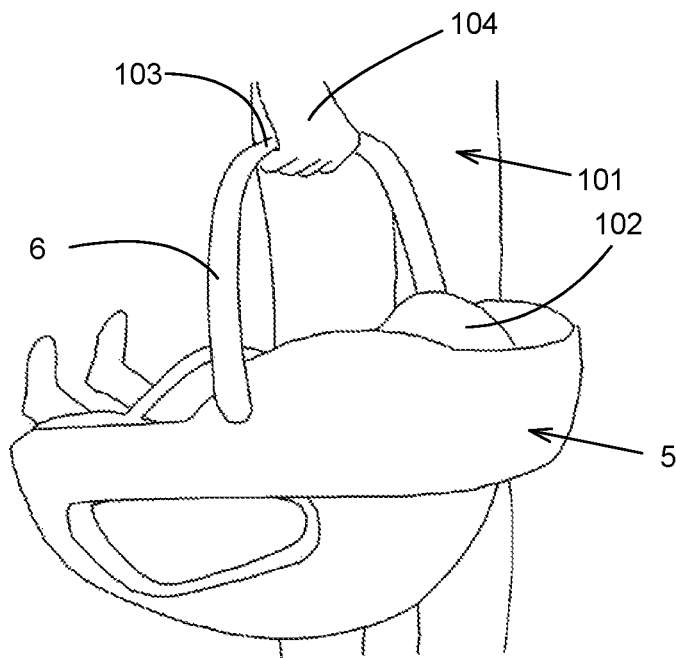
Figure 14:
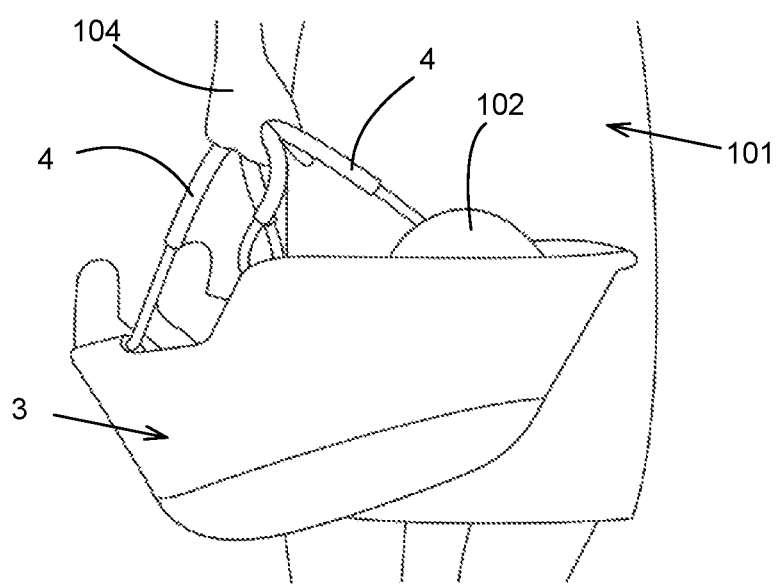

FIGS. 4A, 4B, and 4C are a cross section and side views of the safety part with the child seat on a base of the child seat transporting system according to the present disclosure in a dismounted and mounted position as well as in a position wherein the child seat is disconnected from the safety part being connected to the base;

FIGS. 5A-5E are side views of the safety part with the child seat on a frame of a stroller of the child seat transporting system according to the present disclosure in a dismounted and mounted position as well as in a position wherein the child seat is disconnected from the safety part being connected to the frame of the stroller as well as of a safety part with a first connecting element and an enlarged view of such first connecting element;

FIGS. 6A, 6B, and 6C are different perspective views of the child seat as shown in FIG. 1;

FIGS. 7A and 7B are a perspective view and an enlarged perspective view of the safety part as shown in FIG. 1;

FIG. 8 is a perspective view of coupling mechanisms according to the present disclosure in a first disconnected position thereof, FIGS. 9A and 9B are a perspective view and side view of a detail of FIG. 8, showing coupling mechanisms according to the present disclosure in the first disconnected position thereof;

FIGS. 10A and 10B are perspective views of coupling mechanisms according to the present disclosure in a second connected position thereof;

FIGS. 11A and 11B are a perspective view and side view of a detail of FIG. 10, showing coupling mechanisms according to the present disclosure in the second connected position thereof;

FIGS. 12A and 12B are side views of a second embodiment of a coupling mechanism according to the present disclosure in a first disconnected position and a second connected position respectively;

FIG. 13 is a perspective view of a person carrying a unit comprising a safety part and a child seat connected thereto;

FIG. 14 is a perspective view of a person carrying a child seat by its hand;

FIG. 15 is a perspective view of a person carrying a child seat by its arm; and FIGS. 16A and 16B are rear views of a person carrying a unit comprising a safety part and a child seat connected thereto respectively a child seat.

DETAILED DESCRIPTION

FIG. 1 shows a side view of a child seat transporting system 1 according to the present disclosure comprising a safety part 2 and a child seat 3. On the left side of FIG. 1 the child seat 3 is positioned above the safety part 2 just before connecting the child seat 3 to the safety part 2 as will be explained in more detail here below. The child seat 3 which can be used to transport a child by carrying it on two handles 4 of the child seat 3, which handles 4 extend in longitudinal direction of child seat 3. Preferably the handles 4 are retractable under spring force.

On the right side of FIG. 1 the child seat 3 is inside the safety part 2 and is connected thereto to form an integrated unit 5. The unit 5 can be used to transport a child by carrying it on the U-shaped handle 6 of the safety part 2, which handle 6 is connected to two longitudinal sides of the safety part 2 or by carrying it on two handles 4 of the child seat 3.

The unit 5 can be mounted on a seat of a vehicle and connected thereto by means of vehicle seat belts (not shown) to be guided through hooks 18, 19 mounted on the backside and near the front side of the safety part 2.

Figure 2:
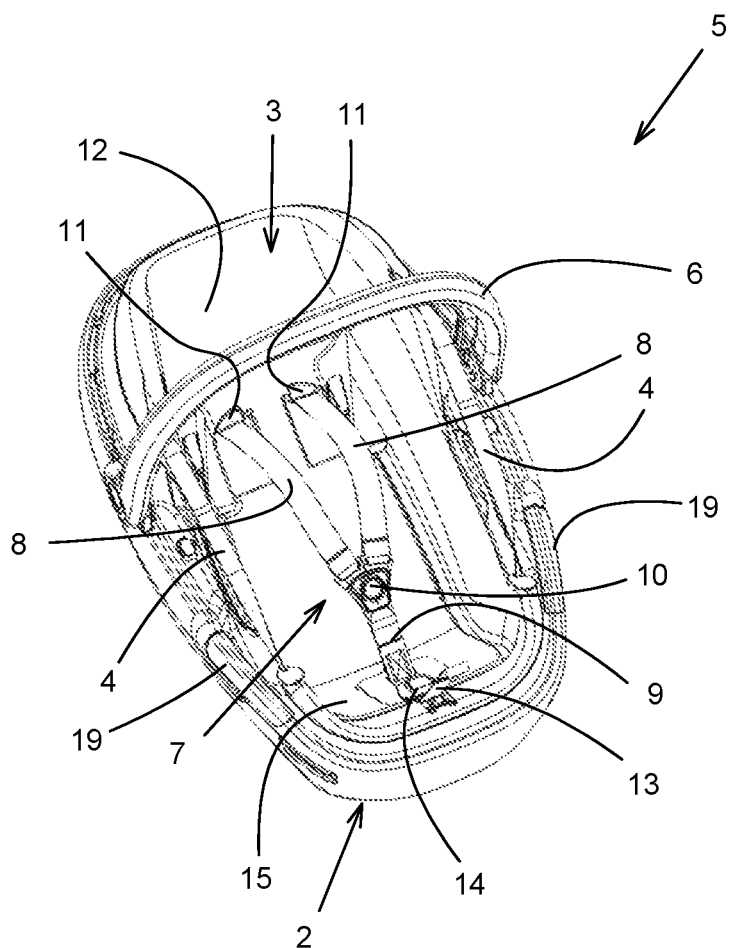
FIGS. 2 and 3 are a perspective views of the safety part and the child seat connected thereto as shown in FIG. 1.
Figure 3:
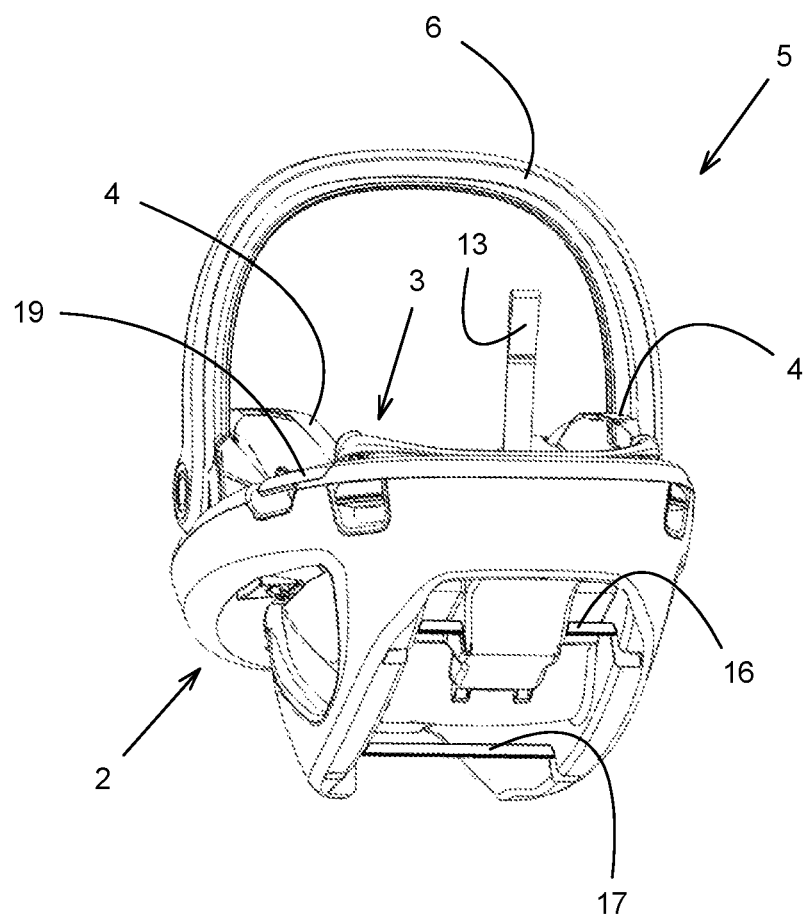

FIGS. 2 and 3 are perspective views of the unit 5 comprising the safety part 2 and the child seat 3 connected thereto.

As can be seen in FIG. 2 the child seat 3 comprises a harness system 7 comprising two shoulder belts 8 and a crotch belt 9. The two shoulder belts 8 and the crotch belt 9 can be connected to each other by means of a lock 10. The shoulder belts 8 extend through holes 11 in a back portion 12 of the child seat 3. At the rear of the back portion 12 the shoulder belts 8 are connected to a single tensioner belt 13. The tensioner belt 13 extends through a tensioner 14 located near a front of the child seat 3. The connection of the crotch belt 9 to the child seat 3 is located on a seat portion 15 of the child seat 3 between the tensioner 14 and the back portion 12. Such harness system 7 is well known in the art and will therefor not further be explained.

FIG. 3 shows the unit 5 from below. As can be seen the safety part 2 comprises at a side remote of the handle 6, two pens 16, 17 extending parallel to each other and perpendicular to the longitudinal direction of the safety part 2.

FIG. 4A shows the unit 5 comprising the safety part 2 and the child seat 3 connected thereto above a base 20 just before moving the unit 5 in a direction P0 towards the base 20 to connect it to the base 20.

The base 20 comprises four hooks 21, 22 (only two are visible) each being rotatable with respect to the base 20 around an axis 23, 24. Two hooks 21 are located near the front side of the base 20 whilst two other hooks 22 are located near the rear side 25 of the base 20. In FIG. 4A the hooks 21, 22 are in a opened position. In a locked position an abutment surface 26 of each hook 21, 22 is located in a recess (not shown) of the base 20 whilst a gripping surface 27 on each hook 21, 22 are located outside the recess.

Each hook 21, 22 is connected to a spring 28 forcing the hook 21, 22 to the opened position. To mount the unit 5 on the base 20, the hooks 21, 22 are being moved by means of a slide 29 of the base 20 to the opened position wherein the pens 16, 17 can be respectively connected to the hooks 22, 21 by pushing the pens 16, 17 onto the abutment surface 26 of the respective hook 21, 22 due to which the hooks 21, 22 will pivot around axis 23, 24 against spring force of the springs 28 to the locked position. The pens 16, 17 will than be located in notches 30, 31 of the hooks 21, 22. The hooks 21, 22 will be locked by locking means. Any other suitable means to connect the safety part 3 to the base 20 may be used.

The base 20 is also provided with hooks 33 near the rear side 25 thereof to connect the base 20 to ISOFIX-connectors 34 mounted in a vehicle. The base 20 is also provided with a leg 35 resting with an end remote of the base 20 on a floor of a vehicle. Such a leg 35 is well known and will therefore not be further explained.

FIG. 4B shows the unit 5 as mounted on the base 20 to form a child seat transporting system 1 to be used in a vehicle.

FIG. 4C shows that the child seat 3 has been removed from the safety part 2 after disconnecting the connection between them as will be explained here below. Preferably the handle 6 is first pivoted in a direction as indicated by arrow P1 about pivot axis 36 towards the rear side 25 of the base 20 to provide more space for the removal of the child seat 3. The use of only the child seat 3 to transport a child located therein and being hold by means of the harness has the advantage that a user only needs to carry the relatively light weighted child seat 3 and the child, whereas the heavier, more sturdy safety part 2 can remain on the base 20 inside the vehicle. The child seat 3 has a width W2 being smaller than the width W1 of the safety part 2. For example, the width W1 is 440 millimetre, whilst W2 is 272 millimetre.

Figure 5A:
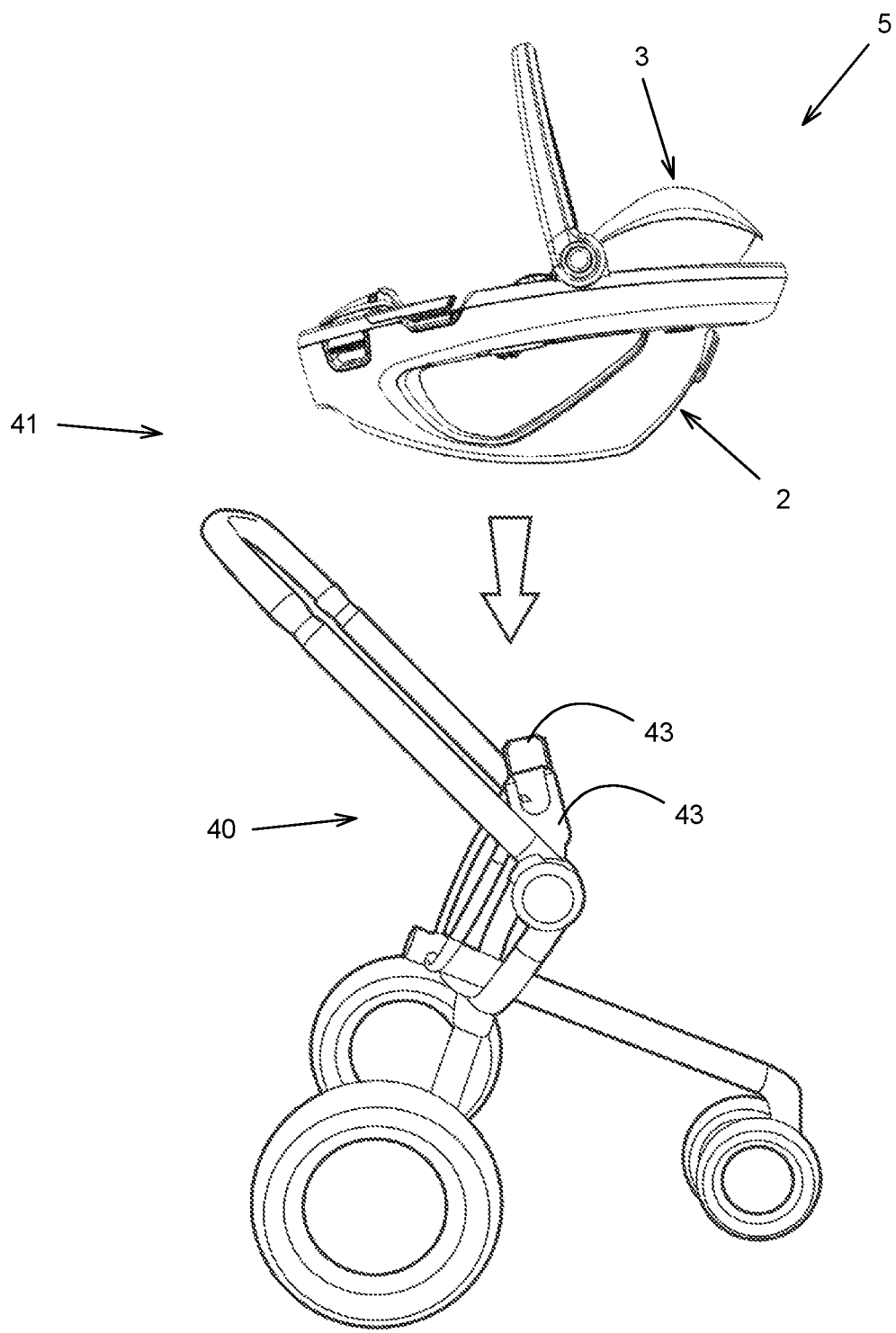

FIG. 5A shows the unit 5 comprising the safety part 2 and the child seat 3 connected thereto above a frame 40 of a stroller 41 just before connecting the unit 5 to the frame 40.

The safety part 2 is provided on both longitudinal sides with first connecting elements 42 (see FIGS. 5D and 5E) whilst the frame 40 of the stroller 41 is provided with two second connecting elements 43. The first connecting elements 42 of the safety part 2 can be detachably connected to the second connecting elements 43 of the frame 40 of the stroller 41. The stroller 41 is preferably foldable and also comprises in a well known manner wheels 44 and a push bar 45. Any other suitable means to connect the safety part 3 to the frame 40 of the stroller 41 may be possible.

Figure 5B:
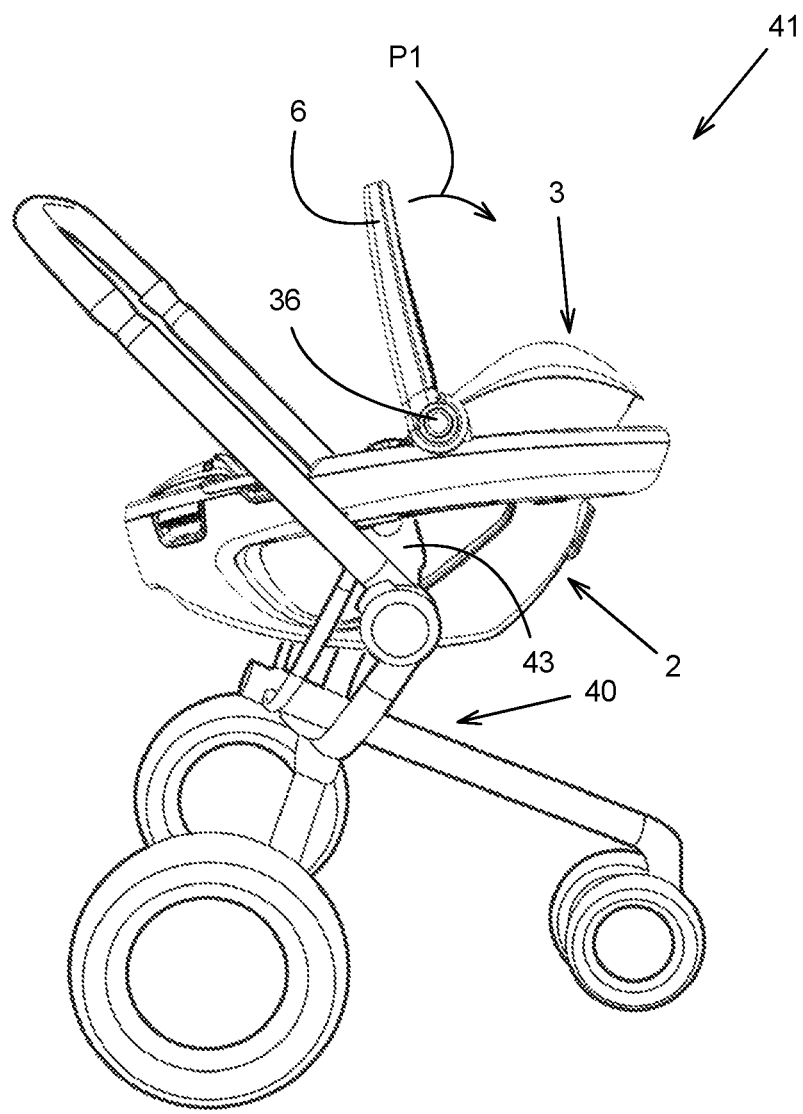

FIG. 5B shows the unit 5 as mounted on the frame 40 of the stroller 41 to form a child seat transporting system 1.

Figure 5C:
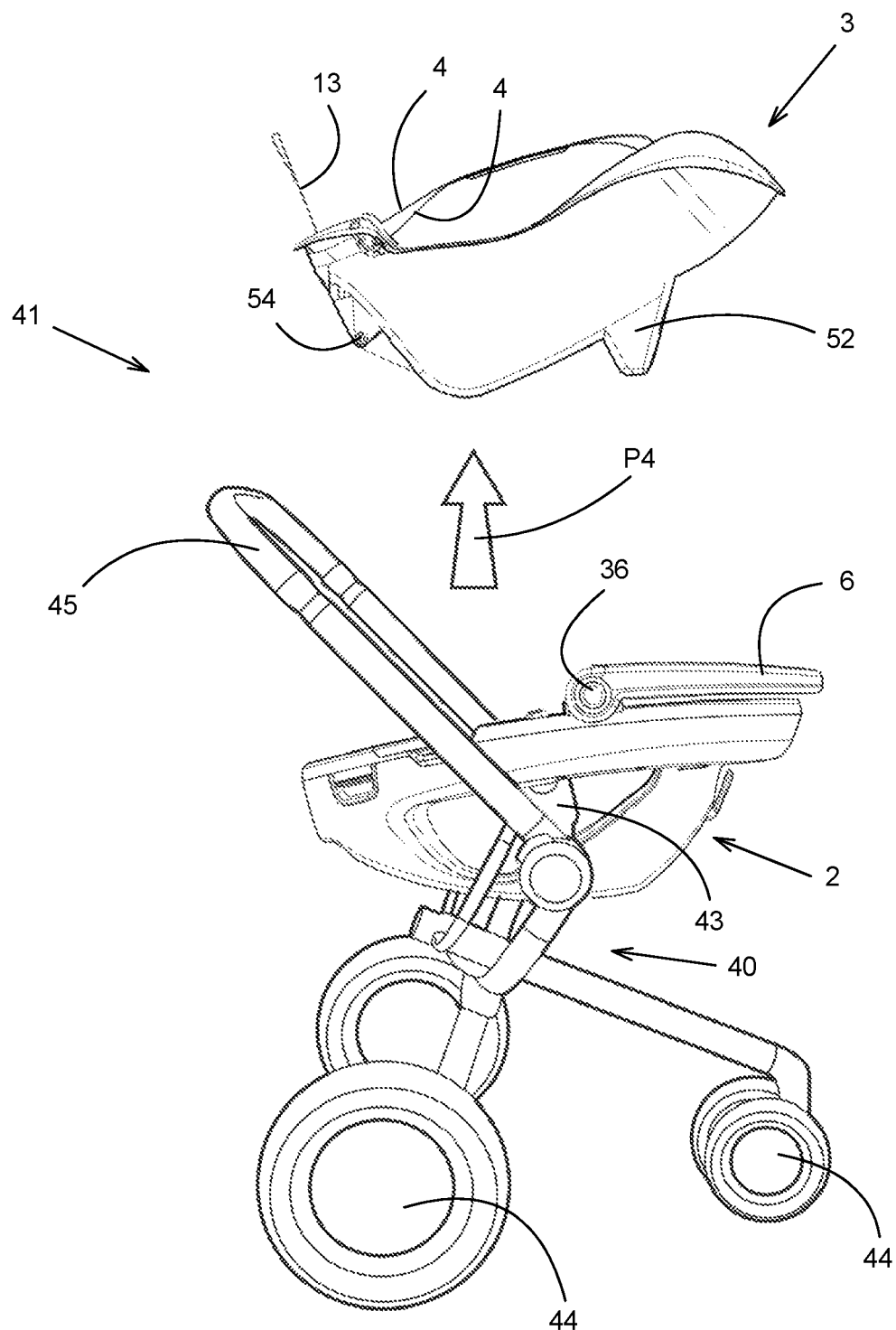
Figure 5D:
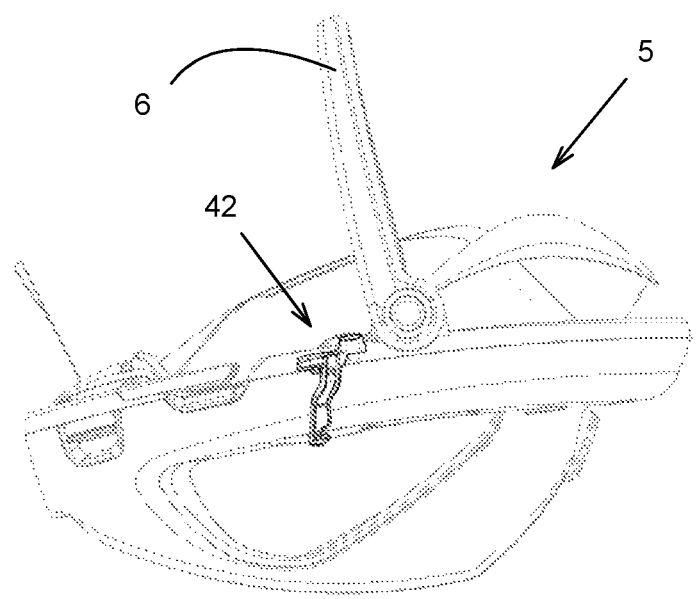
Figure 5E:
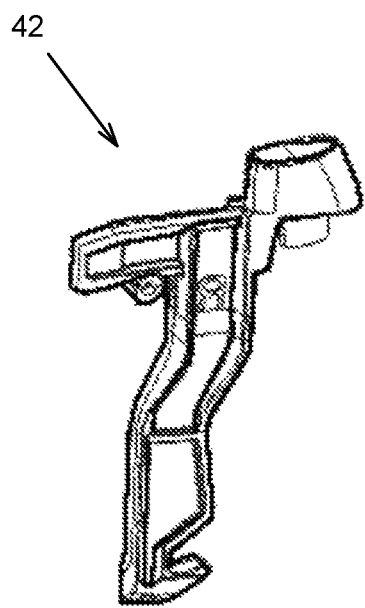

FIG. 5C shows that the child seat 3 has been removed from the safety part 2 after disconnecting the connection between them and moving the unit 5 in a direction P4 away from the safety part 2 mounted on the stroller 41 as will be explained here below. Preferably the handle 6 is first pivoted in a direction as indicated by arrow P1 about pivot axis 36 to provide more space for the removal of the child seat 3. The use of only the child seat 3 to transport a child located therein and being hold by means of the harness has the advantage that a user only needs to carry the relatively light weighted child seat 3 and the child, whereas the heavier and more sturdy safety part 2 can remain on the frame 40 of the stroller 41.

FIGS. 6A-6C show different views of the child seat 3. The child seat 3 comprises a shell 51 made of plastic such as polypropylene (PP). The same material can be used for the safety part 2. However the wall thickness of the child seat 3 will be less than the wall thickness of the safety part 3. At a rear side of the back portion 12 the child seat 3 comprises two protrusions 52. The protrusions 52 can be inserted into blind holes 53 of the safety part 2 to position the child seat 3 in the safety part 2 and to prevent the child seat 3 to be able to tilt with respect to the safety part 2. Furthermore the child seat 3 can rest with the protrusions 52 on a flat surface when used without the safety part 2.

At a side below the seat portion 15 the child seat 3 comprises a pen 54 extending perpendicular to the longitudinal direction of the child seat 3 and perpendicular to side walls 61 of the shell 51. An end of the crotch belt 9 remote of the lock 10 is connected to the pen 54. The pen 54 is supported by and extends through two flanges 55 forming an integral part of the shell 51. Each end 56 of the pen 54 forms a first pen of the coupling mechanism according to the present disclosure.

FIGS. 7A and 7B show different views of the safety part 2. The safety part 2 is made from a rigid plastic such as polypropylene (PP). The weight of the child seat 3 is about 2 kilogram, the weight of the safety part 2 is about 3.4 kilogram, so the weight of the unit 5 is about 5.4 kilogram. Both the child seat 3 and the safety part 2 are preferably covered with a textile.

The safety part 2 comprises a ring shaped frame 57 extending around the upper side of the safety part 2. The ring shaped frame 57 blocks the safety part 2 and therefor the child seat 3 when located inside the safety part 2 to be deformed in case of a crash like a car incident. The safety part 2 is provided with two enlarged passages 58 to reduce the weight of the safety part 2.

Due to the safety part 2, the unit 5 comprising the safety part 2 and the child seat 3 provides the requirements regarding safety.

The safety part 2 comprises a bottom part 59 to support the child seat 3. The blind holes 53 are located on both sides of the bottom part 59. The safety part 2 is near a front side thereof provided with two recesses 60 through which the pen 54 of the child seat 3 can be connected to two first hooks of the coupling mechanism according to the present disclosure, as will be explained here below.

FIGS. 8-11 show a first embodiment of the coupling mechanism 71 according to the present disclosure.

The coupling mechanism 71 comprises two coupling elements 72 each provided with the first hook 73 and a second hook 74. The coupling elements 72 are pivotable about pivot axes 75. Part of the coupling mechanism 71 is also pen 54 of the child seat 3 as well as pen 16 of the safety part 2 by means of which the safety part 2 can be connected to the base 20. The pen 54 cooperates with first hooks 73 whilst the pen 16 cooperates with second hooks 74.

As can be seen in FIG. 8 pen 54, pen 16 and axes 75 extend parallel to each other.

Each coupling element 72 is also provided with a third hook 76. The third hook 76 is attached to a spring 77. The spring 77 is attached at an end remote of the third hook 76 to an operating device 78.

In the FIGS. 8, 9A and 9B the coupling elements 72 are in a first position wherein the pen 54 of the child seat 2 is disconnected from the first hooks 73 and the child seat 3 and safety part 2 can be decoupled from each other. In the first position pen 16 of the safety part 2 is also is disconnected from the second hooks 74.

Each coupling elements 72 comprises an abutment surface 79. Each first hook 73 comprises a notch 80 and a gripping surface 81. Each second hook 74 comprises a notch 82 and a gripping surface 83. In the first position the abutment surfaces 79 are located in the recesses 60 whilst the notches 80 and the gripping surfaces 81 on the first hook 73 are located outside the recesses 60.

Each coupling elements 72 also comprises a locking surface 84.

When positioning the child seat 3 on the safety part 2 the protrusions 52 of the child seat 3 are inserted into the blind holes 53 of the safety part 2 and the pen 54 of the child seat 3 is brought into the recesses 60 and is pressed with a pressing force against the abutment surfaces 79 of the coupling elements 72. Due to this pressing force, the coupling elements 72 are being pivoted about the pivot axes 75 against spring force of the springs 77 in a direction indicated by arrow P2 to a second position. In the second position, as shown in FIGS. 10A-11B, the pen 54 of the child seat 3 is located in the notches 80 of the first hooks 73 and engaged to the safety part 2 by means of the first hooks 73 and the gripping surfaces 81 thereof, whilst the pen 16 of the safety part 2 is located in the notches 82 of the second hooks 74. In this second position the pen 54 of the child seat 3 is directly coupled via the coupling elements 72 to the pen 16 of the safety part 2. In case that the safety part 2 is coupled by means of the pen 16 to the base 20, the child seat 3 is directly coupled via the coupling elements 72 to the pen 16 of the safety part 2 and to the base 20. Preferably the pens 56, 16 and the coupling elements 72 are made of a strong material like metal so that relatively large forces can easily and efficient be transmitted from the pen 54 to the pen 16 and to the base 20. Preferably the crotch belt 9 is connected to the pen 54. When the unit 5 is mounted on the base 20 forces on the harness 7, for example in case of a crash, will be transmitted via the crotch belt 9, the pen 54, the coupling elements 72 and the pen 16 directly to the base 20. This has the advantage that the other parts of the child seat 3 can be less strong, which provides a great degree of freedom of design.

In FIG. 7B the coupling elements 72 pivot in a clockwise direction from the first to the second position.

In the second position the locking surfaces 84 of the coupling elements 72 are brought in contact with locking surface 85 on the operating device 78 to lock the coupling elements 72 and the hooks 73, 74 thereof in said second position.

To unlock the locking surfaces 84, 85 the operating device 78 is being pivoted about pivot axis 86 against spring force of springs 77 in a direction as indicated by arrow P3, whereby under spring force of the springs 77 the coupling elements 72 are being pivoted in a direction opposite to arrow P2. When pivoting the coupling elements 72 in a direction opposite to arrow P2, abutment surfaces 79 of the coupling elements 72 pushes the pen 54 slightly out of the notches 80, whereafter still under spring force of the springs 77 the coupling elements 72 pivot to the first position.

As can be seen in FIG. 9B an angle A between a first virtual line 90 between the first pen 54 of the child seat 3 and the pivot axis 75 and a second virtual line 91 between the second pen 16 of the safety part 2 and the pivot axis 75 is for example 102 degrees. An angle B between the first virtual line 90 horizontal H is for example between 48 and 63 degrees, so for example 55 degrees. As long as the angle B is less than 90 degrees, preferably less than 63 degrees and more preferably less than 55 degrees, the movement of pen 54 in vertical direction along the vertical V towards and against the abutment surfaces 79 will cause pivoting of the coupling elements 72 in the direction indicated by arrow P2. The angle A as well as the distance between the first pen 54 of the child seat 3 and the pivot axis 75 determines the force needed to pivot the coupling elements 72. The pivoting is independent of the location and distance of the pen 16 with respect to the pivot axis 75. As can be seen in FIG. 9B the pen 54 is located almost exactly vertical above the pen 16. Due to the coupling elements 72 comprising the first and second hooks 73, 74a freedom to determine the locations of the pens 54, 16 and axis 75 is obtained, whilst still a direct transmission of the forces from the pen 54 via coupling element 72 to pen 16 is obtained.

FIGS. 12A and 12B show a second embodiment of a coupling element 92 of a coupling mechanism according to the present disclosure.

The coupling element 92 differs from the coupling element 72 in that it comprises a slotted hole 93 in which the pen 16 is located. A part of a wall 94 bounding the slotted hole 93 forms the second hook.

In FIG. 12A the pen 16 is located against a first end 95 of the slotted hole 93. This position defines the first position of the coupling element 92.

In FIG. 12B the pen 16 is located against a second end 96 of the slotted hole 93. This position defines the second position of the coupling element 92.

FIG. 13 is a perspective view of a person 101 carrying a unit 5 comprising a safety part 2 and a child seat 3 connected thereto with a hand 104. A child 102 is present in the child seat 3. As can be seen also in FIG. 16A, the part 103 of the handle 6 extends perpendicular to the walking direction of the person. Safety part 2 and thus unit 5 has a width W1.

FIG. 14 is a perspective view of a person 101 carrying a child seat 3 by its handles 4 with a hand 104. The weight of the child seat 3 to be carried is less than the weight of the unit 5. Furthermore, the child seat 3 has in a direction perpendicular to the walking direction of the person a width W2 being smaller than the width W1 of unit 5 so that the child seat 3 can be held closer to the body of the person 101. This also makes it easier to carry the child seat 3. The difference can also easily be seen from the FIGS. 16A and 16B showing respectively a rear view of a person carrying the unit 5 respectively a child seat 2. Also the orientation of the hand 104 is different. To carry the unit 5 the person must turn its wrist to be able to place its hand 104 on part 103 of the handle 6. To carry only the child seat 2 the person 101 can held its arm 105 almost flat along its body and does not need to turn its wrist.

FIG. 15 is a perspective view of a person carrying a child seat 2 by its arm 105. Due to the flexible handles 4 and the orientation thereof, the child seat 3 can also be easily carried close to its body on the persons arm 105.

The child seat transporting system 1 according to the present disclosure has the advantage that the child can be transported in a number of different manners which can each time be chosen depending on the wishes of the person taking care of the child.

It is also possible to use in other embodiments the coupling mechanism to couple the safety part to the base, to couple the child seat directly to the base or to couple other components to each other. In case that the child seat will be directly coupled to the base, the child seat must fulfil the required safety regulations.

It is also possible to connect the child seat 3 with other means to the safety part 2.

By the embodiment as shown in FIGS. 8-11 the coupling mechanism comprises two coupling elements. However, it is also possible to use only one or more than two coupling elements.

It is also possible that the safety part comprises ISOFIX-connectors so it can be directly connected to the vehicle seat without a vehicle belt.

It is also possible to use another element not being a pen 16 as attachment means for the safety part 3 and to guide forces from the safety part 3 to the base 2.

In the drawings, like reference numerals refer to like elements.

A comparative child seat transporting system of Team Tex called Satellite Isofix Car Seat Group 0+ comprises a base to be connected by means of Isofix connectors to a vehicle seat. On said base an outer seat can be mounted, whereas an inner child seat can be connected to the outer seat. The inner seat can directly be mounted on a frame of a stroller.

A disadvantage of such a comparative child seat transporting system is that the outer seat is rather bulky and can, due to its size, only be used as an intermediate structure between the inner seat and the base.

Furthermore, since the inner seat is directly mounted on the frame of the stroller, the width of the inner seat must be so large that its longitudinal sides can be connected to supporting elements on the sides of the frame of the stroller. Due to this width the inner side is relative large and heavy to be carried by a person from the base inside a vehicle to the frame of the stroller or to some other location.

The invention claimed is:

1. A child seat transporting system comprising
at least a safety part being detachably connectable to a vehicle seat and
a child seat being detachably connectable to the safety part, which child seat comprises at least one child seat handle to carry the child seat when disconnected from the safety part,
wherein the safety part, when disconnected from the vehicle seat, is detachably connectable to a frame of a stroller, whereby when the safety part with the child seat connected thereto is connected to the frame of the stroller, the child seat is detachable from the safety part.

2. The child seat transporting system of claim 1, wherein the safety part comprises at an inner side thereof at least one first connector to detachably connect the child seat to the safety part and at an outer side thereof at least one second connector at a first longitudinal side and a second longitudinal side of the safety part to detachably connect the safety part to the frame of the stroller.

3. The child seat transporting system of claim 1, wherein the safety part comprises third connectors to detachably connect the safety part to the vehicle seat by means of vehicle seat belts.

4. The child seat transporting system of claim 1, wherein the child seat transporting system comprises a base being detachably connectable to the vehicle seat, wherein the safety part is detachably connectable to the base.

5. The child seat transporting system of claim 4, wherein the safety part comprises at least one fourth connector to detachably connect the safety part to the base.

6. The child seat transporting system of claim 1, wherein the safety part comprises a safety part handle to carry at least the safety part together with the child seat connected thereto, when the safety part is disconnected from the vehicle seat and the frame of the stroller.

7. The child seat transporting system of claim 6, wherein the safety part handle is connected to the first longitudinal side and the second longitudinal side of the safety part, whilst the at least one child seat handle extends substantially parallel to longitudinal sides of the child seat, wherein the longitudinal sides of the safety part and the longitudinal sides of the child seat extend parallel to each other when the child seat is connected to the safety part.

8. The child seat transporting system of claim 7, wherein the safety part handle has a rigid U-shaped form.

9. The child seat transporting system of claim 1, wherein the at least one child seat handle is retractable under spring force.

10. The child seat transporting system of claim 1, wherein the child seat comprises two child seat handles, one near each of two longitudinal sides of the child seat.

11. The child seat transporting system of claim 1, wherein the child seat comprises a harness system to hold a child in the child seat.

12. A safety part suitable for the child seat transporting system of claim 1, which safety part is in use detachably connectable to at least a vehicle seat and a frame of a stroller, wherein in use a child seat is detachably connectable to the safety part.

13. The safety part of claim 12, wherein the safety part comprises third connectors to detachably connect the safety part to the vehicle seat by means of vehicle seat belts.

14. The safety part of claim 12, wherein the child seat transporting system comprises a base being detachably connectable to the vehicle seat, wherein the safety part is detachably connectable to the base.

15. The safety part of claim 14, wherein the safety part comprises at least one fourth connector to detachably connect the safety part to the base.

16. The safety part of claim 12, wherein the safety part comprises a safety part handle to carry at least the safety part together with the child seat connected thereto.

17. The safety part of claim 16, wherein the safety part handle is connected to a first longitudinal side and a second longitudinal side of the safety part.

18. The safety part of claim 16, wherein the safety part handle has a rigid U-shaped form.

19. The safety part of claim 1, wherein the safety part comprises at an inner side thereof at least one first connector to detachably connect the child seat to the safety part and at an outer side thereof at least two second connectors at a first longitudinal side and a second longitudinal side of the safety part to detachably connect the safety part to the frame of the stroller.

\* \* \* \* \*